United States Patent [19]
Grimes et al.

[11] 3,975,797
[45] Aug. 24, 1976

[54] SHRIMP PROCESSING APPARATUS

[75] Inventors: Eldon L. Grimes, Seattle, Wash.;
Kenneth W. Bullock, Gearhart, Oreg.

[73] Assignee: Marine Construction & Design Co., Seattle, Wash.

[22] Filed: Mar. 22, 1974

[21] Appl. No.: 453,565

[52] U.S. Cl. .................................... 17/73
[51] Int. Cl.² ................................ A22C 29/00
[58] Field of Search ............... 17/73, 71, 72, 53; 248/20

[56] References Cited
UNITED STATES PATENTS

| | | |
|---|---|---|
| 2,540,525 | 2/1951 | Howarth et al. ............ 248/20 X |
| 2,794,209 | 6/1957 | Self ............................ 17/71 |
| 3,018,510 | 1/1962 | Lapeyre et al. ............ 17/73 |
| 3,816,877 | 6/1974 | Bullock ...................... 17/73 |

*Primary Examiner*—11
*Assistant Examiner*—William R. Browne
*Attorney, Agent, or Firm*—Christensen, O'Connor, Garrison & Havelka

[57] ABSTRACT

Cooked shrimp to be peeled are distributed successively to tiers of sets of peeler rolls and cooperative reciprocative bars. The claimed invention permits coordinated adjustments of nip spacing and taper angle in the roll-bar tiers independently at corresponding ends of the sets and in each tier independently of the other permit optimum shucking in the first tier and polishing in the second tier suited to type and condition of shrimp. Cams are engaged by cam follower rollers connected to the peeler rolls to control nip distance between the bar and rolls at both ends as a function of relative vertical positioning of each bar and its associated peeler rolls.

15 Claims, 13 Drawing Figures

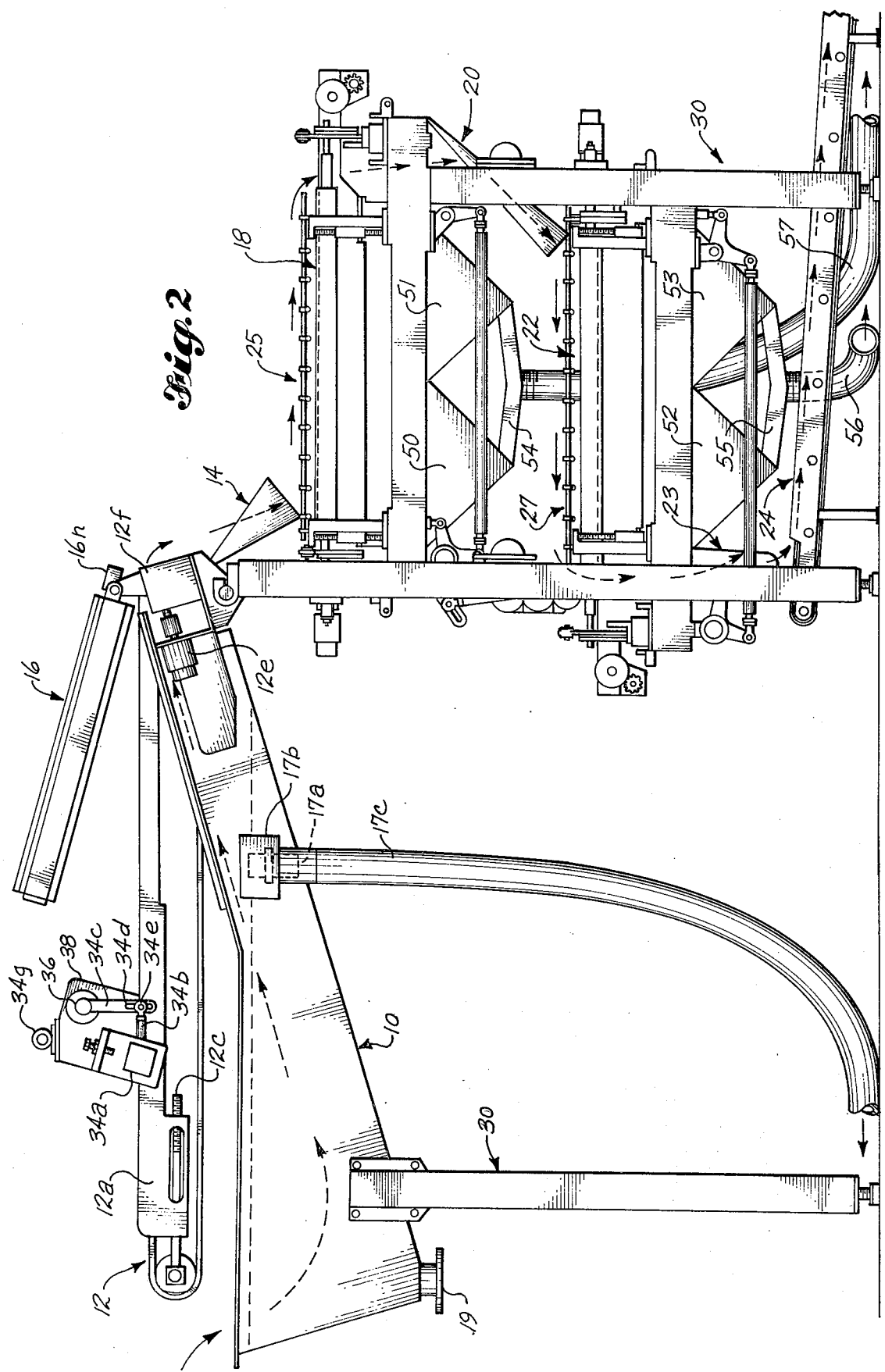

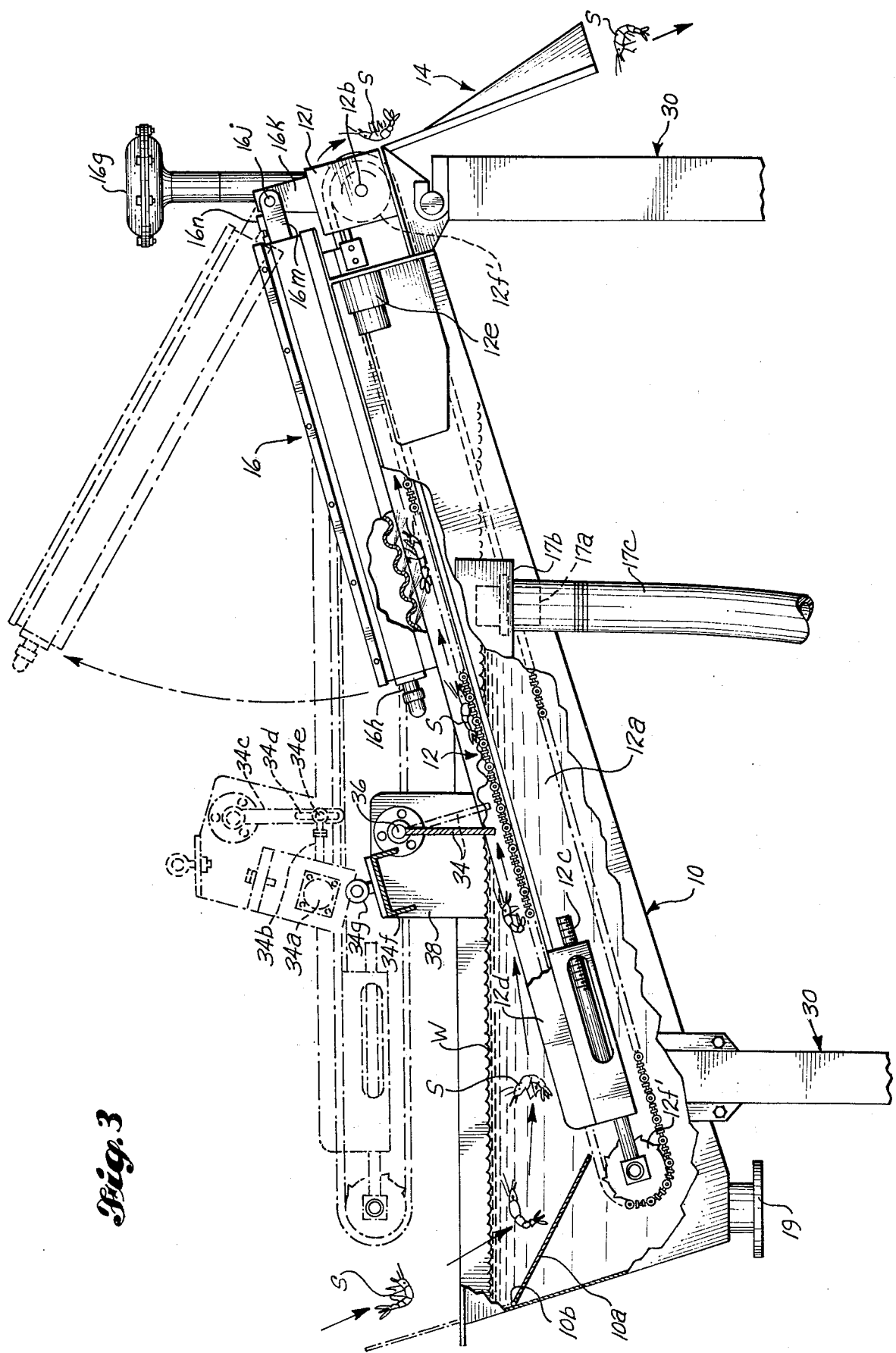

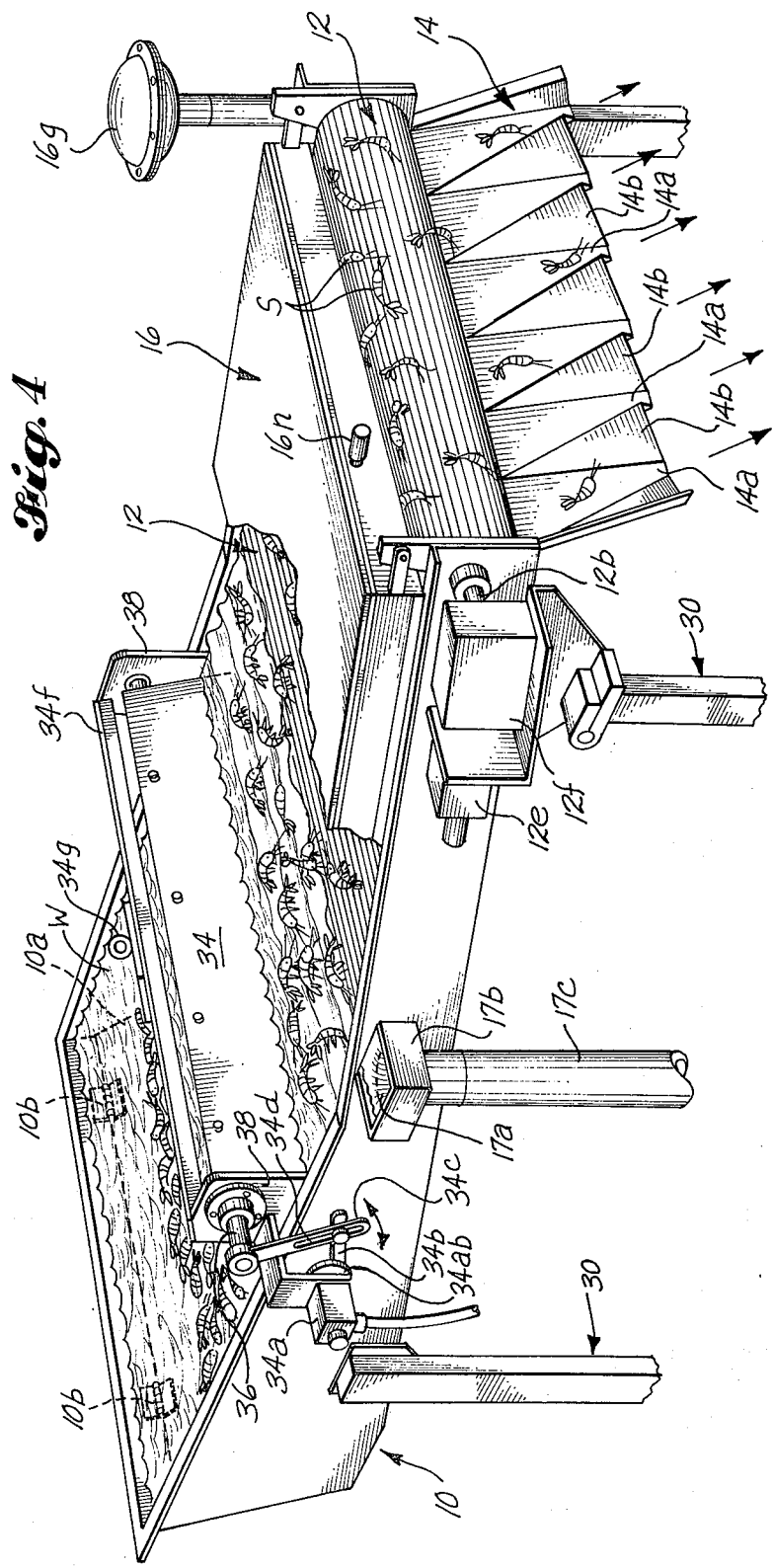

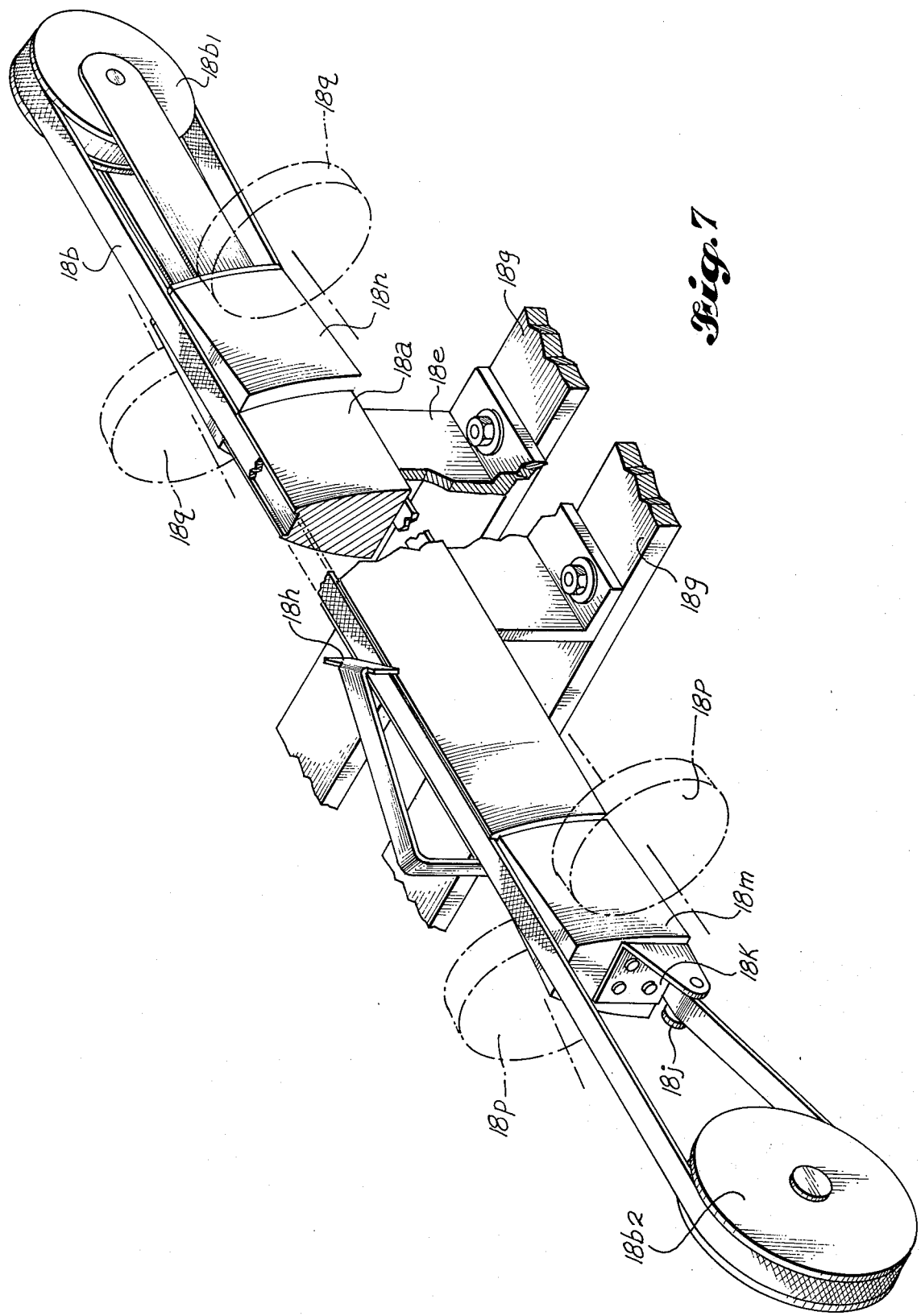

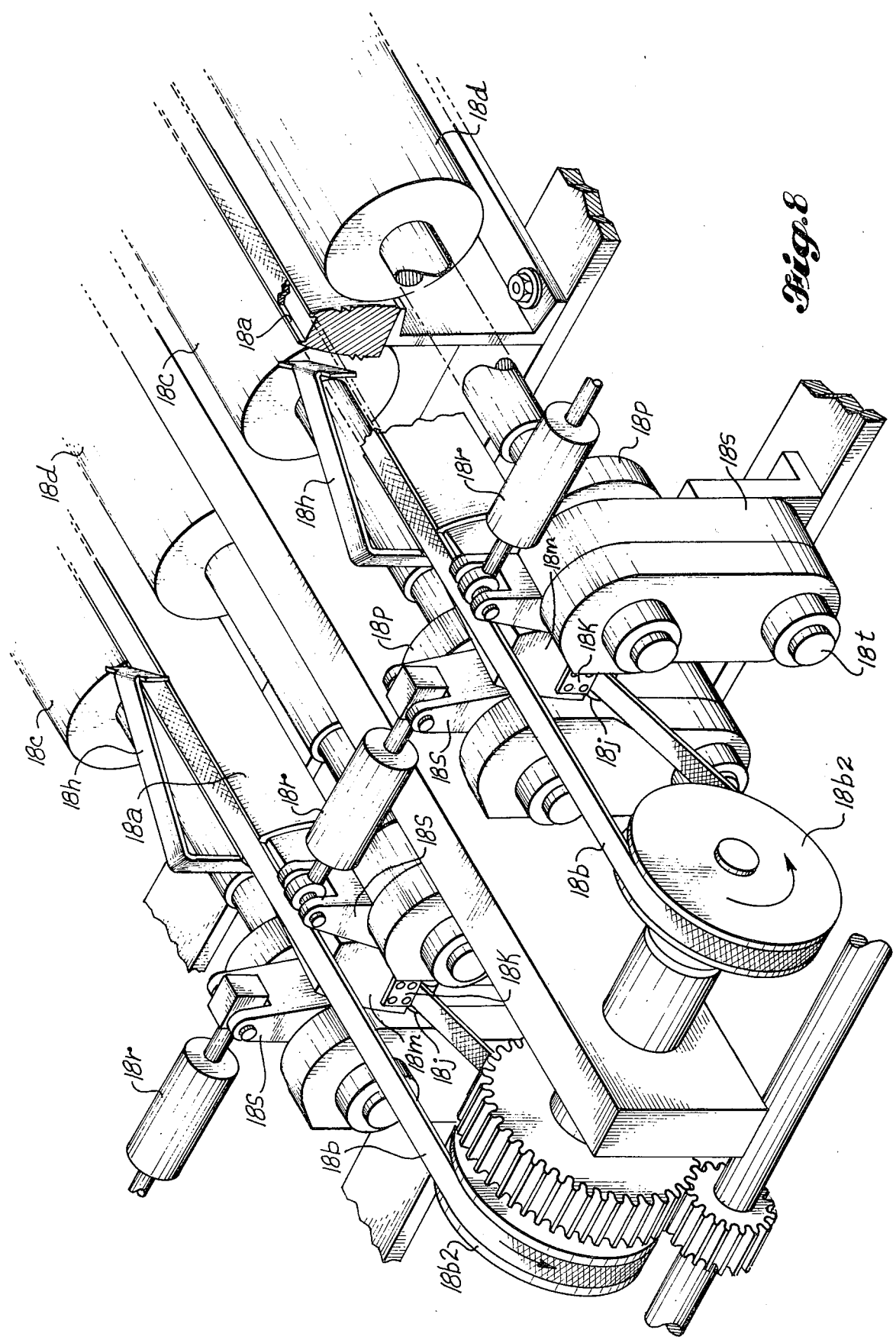

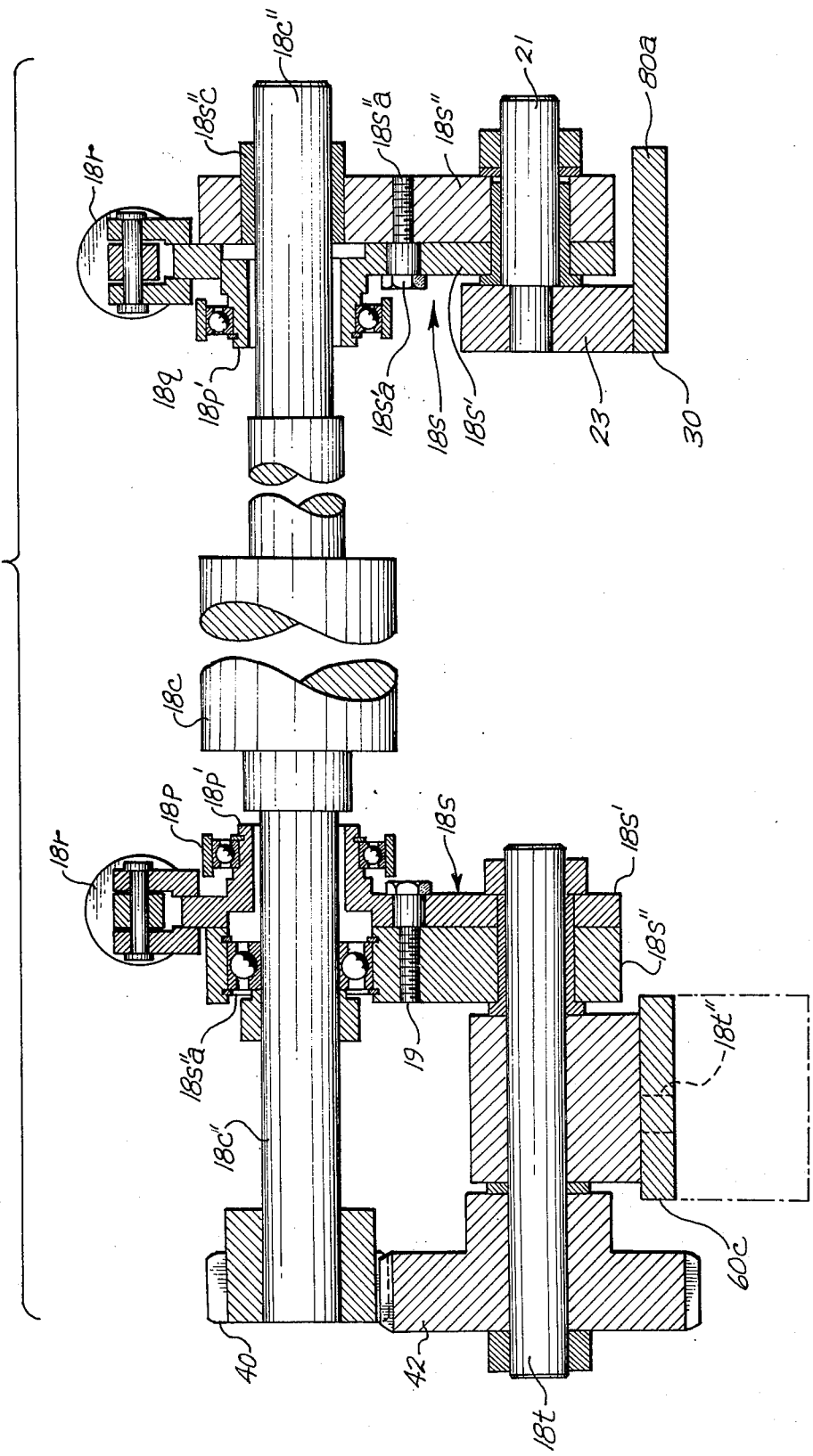

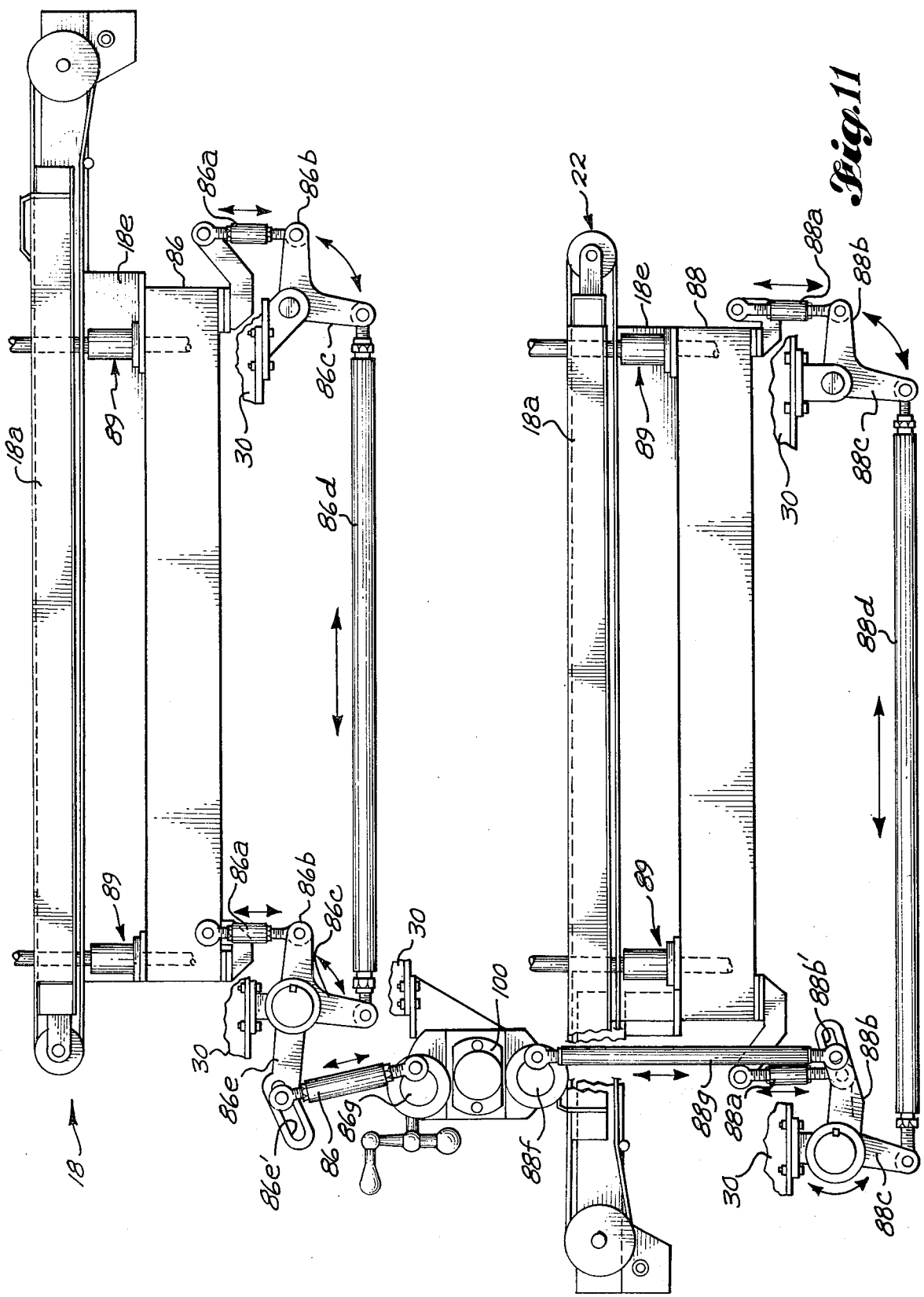

SHRIMP PROCESSING APPARATUS

BACKGROUND OF THE INVENTION

This invention relates to improvements in apparatus for machine processing of shrimp and similar articles requiring shucking, or peeling. More particularly, this invention concerns an improved shrimp peeler machine devised for meeting the varying requirements of processing different sizes and types of shrimp. The invention is herein illustratively described by reference to the presently preferred embodiment; however, it will be recognized that certain modifications and changes therein with respect to details may be made without departing from the essential features involved.

One of the problem areas for shrimp processing machine manufacturers is to serve the area including the waters of the Pacific Northwest and Alaska. In these waters, there are shrimp of varying sizes and types, all of commercial value if economically processed. For many years, hand peeling was required because of the variations in the size and character of these creatures, and generally because of the difficulties of achieving uniform peeling with prior types of mechanical peelers. Such processing made the product extremely expensive on the market.

A broad object of this invention therefore, is to devise an improved shrimp peeling machine and more particularly, an improved shrimp peeling and polishing machine wherein the rough shucking or peeling operation occurs in one stage of the machine and the final polishing or cleaning in a succeeding stage.

A further object is to devise an improved, fully mechanized system for peeling of shrimp rapidly in large quantities adapted to be operated in conjunction with means for preliminary cooking and infeed conveyor apparatus Still another object is to devise a versatile and readily adjustable peeler machine which will perform either or both rough peeling or shucking and/or polishing of the shrimp, utilizing and extending the teachings of Bullock patent application Ser. No. 195,192, filed Nov. 3, 1971, entitled SHRIMP CLEANING MACHINE, since matured into U.S. Pat. No. 3,816,877. More specifically the invention provides for conjoint adjustability of sets of peeler rolls and associated peeler bars, both as to average nip spacing or clearance and as to the amount and direction of taper of the nips lengthwise of the peeler rolls. Accordingly, changeover adjustments in the machine may be made quickly to suit the requirements of different sizes or types of shrimp encountered at different times.

Simplicity of servicing and ready accessibility of all portions of the machine for inspection, cleaning and repairs with minimum dismantling represent further objectives hereof.

Another broad object hereof is to devise a relatively compact system for processing of shrimp and the like requiring a relatively small amount of floor space for the production capacity attainable with the machine.

BRIEF DESCRIPTION OF THE INVENTION

In accordance with this invention the nips between the vertically reciprocating peeler bars and respectively associated pairs of peeler rolls of a rough peeler section of the machine are made adjustively variable, both as to nip spacings or clearance, and as to nip taper in the direction of conveyance along the sets of rolls. The peeling action and advancement of the shrimp along the peeler rolls occurs basically as in the Bullock patent application Ser. No. 195,192, filed Nov. 3, 1971. Vertically shaped cams are arranged to move up and down with the peeler bars at the respective ends thereof. Such cams are engaged by cam follower rollers connected to the peeler rolls to control nip distance between the bar and rolls at both ends as a function of relative vertical positioning of each bar and its associated peeler rolls. Preferably, in accordance with this invention peeler nip taper adjustability is achieved by forming the cams with taper longitudinally of the rolls and adjustively varying the stationing of the opposed cam follower rollers along such cams. By providing independence in the cam follower adjustability means at opposite ends of the peeler rolls the operator may employ such means to adjust both taper amount and direction and average clearance or gap in the peeler nips.

An underlying polishing peeler roll and bar assembly bank or tier of similar construction and variable adjustability is provided, to which the shrimp are directed by a guide means after traversing the peeler bank above. Thus the nip clearances and taper in the underlying polisher roll assembly are independently adjustable to suit the requirements of the polishing operation.

These and other features, objects and advantages of the invention will become more fully evident by the following description thereof by reference to the accompanying drawings.

IDENTIFICATION OF DRAWINGS

FIG. 2 is a side elevation view of the machine with the cooker means and conveyor means pivoted upward out of operating position.

FIG. 3 is a side elevation view of the in-feed cooker section of the machine at enlarged scale, and FIG. 4 is an isometric view thereof.

FIG. 7 is an enlarged isometric view of a peeler bar, associated carrier belt, and the positioning cam and roller arrangement controlling relative positioning of the peeler rolls (not shown) cooperating with the peeler bar.

FIGS. 8 and 9 are enlarged isometric views of respectively opposite fragmentary end portions of two sets of peeler rolls, bars, carrier belts with drive means therefor, and associated positioning means for the rolls.

FIG. 10 is a vertical, longitudinal sectional detail view showing the peeler roll mounting and driving arrangement.

FIG. 11 is a simplified side elevation view of the peeler section and underlying polishing section of the composite machine particularly showing general features of the coordinating drive for the sets of rough peeler and polishing peeler rolls and bars.

Figure 12:
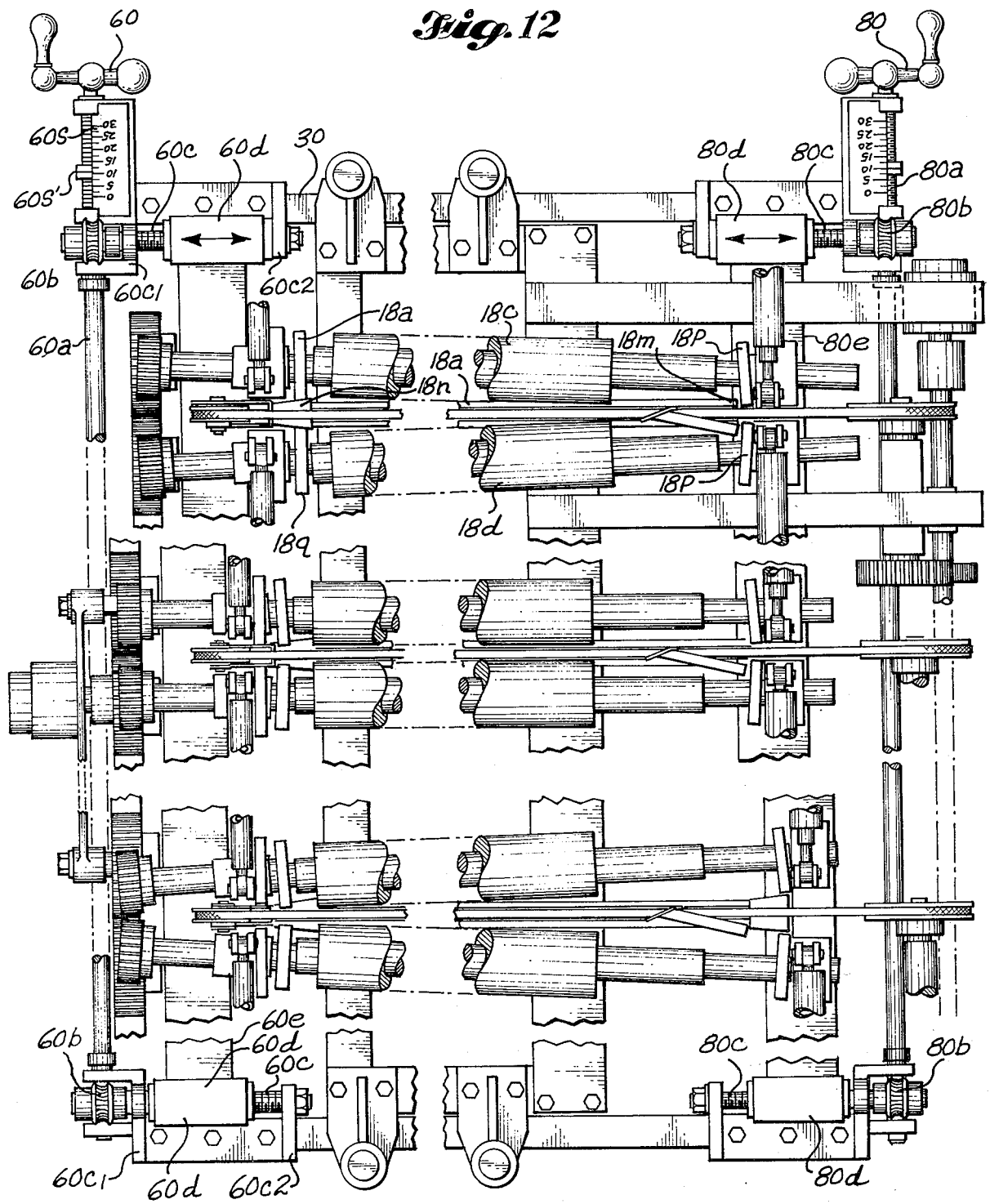

FIG. 12 is a plan view of three sets of peeler rolls and associated peeler bars in the same tier illustrating the means for accomplishing roll cant positioning and the range of effects obtained thereby, including cant in one direction, zero cant and cant in the opposite direction, respectively. These differing positions would ordinarily not be imparted to sets of rolls in the same tier under operating conditions because their positionings are coordinated; hence the view is intended purely to illustrate positional possibilities for all sets of peeler rolls in a tier.

Figure 13:
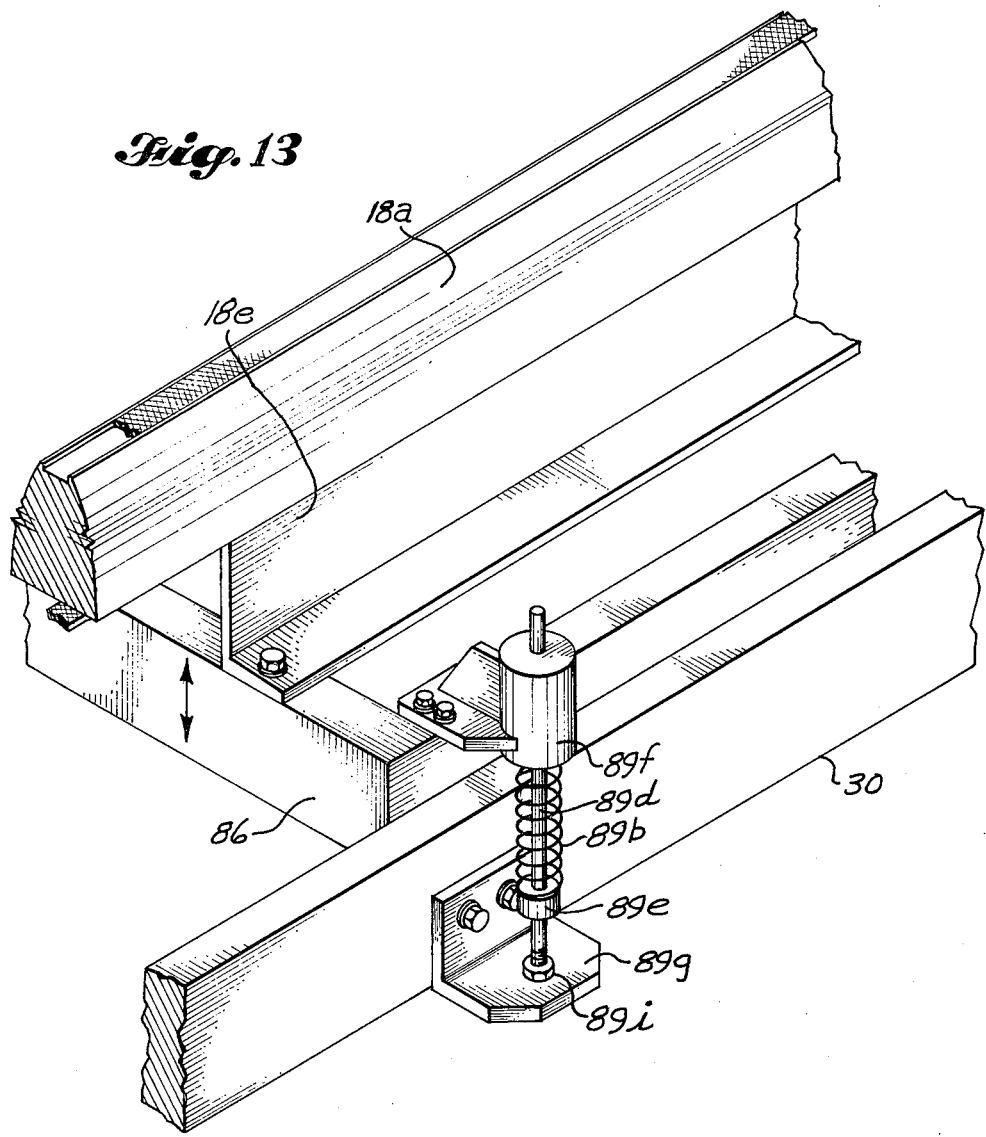

FIG. 13 is an enlarged isometric view of one of four shock absorbing spring mechanisms applied to each tier between the basic frame structure of the machine and the vertically reciprocating peeler bar support frame in order to ease the load on the system in reversing the motion of reciprocation.

DETAILED DESCRIPTION OF THE EMBODIMENT OF THE INVENTION

The various components and sections of the overall machine embodiment in which the invention is described herein are mounted on a basic frame 30 with various posts, beams and braces, details of which are primarily a matter of design choice. While the shrimp may be precooked and delivered to the improved peeler mechanism in any of various ways, the illustrative machine includes a container means 10 for a water bath W into which shrimp S or other articles are first deposited. An elongated endless belt conveyor 12 having its lower end immersed in the bath, is inclined upwardly therefrom to carry the shrimp out of the bath for discharge onto a distributor chute 14. A low-pressure steam cooker 16 overlying the upper portion of the conveyor means 12 cooks the shrimp while they are moving on the conveyor after emerging from the bath and before they drop onto the chute 14. Rough peeling or shucking of the shrimp occurs in their transit through the primary peeler section 18. From section 18 they drop onto the distributor chute 20 for deposit on the underlying secondary or polishing peeler section 22. After leaving the polisher section the shrimp drop into a second distributor chute 23 and are deposited on a suitable off-bear conveyor 24 which delivers them for packaging or further processing as desired.

Both the primary peeler roll section and the underlying polishing peeler roll section of the present machine operate according to improvements upon or extensions of the teachings of Bullock patent application Ser. No. 195,192, filed Nov. 3, 1971, the disclosure of which is hereby incorporated by this reference, and even more fundamentally in certain respects according to the teachings of Welcker et al U.S. Pat. No. 3,080,605, Food Processing.

Bath container 10, deepest at its receiving end into which the shrimp are initially deposited, has a bottom which slopes upwardly to its oppositely situated discharge end at approximately the slope desired for conveyor 12. The upper end of elongated conveyor frame 12a of belt conveyor 12 is mounted on the basic support frame 30 by means of the horizontal, transversely oriented conveyor belt pulley-roll shaft 12b. This mounting permits swinging the conveyor up and down by its opposite end portion between its normal solid-line position for operation with such end portion immersed in the bath W, as shown in FIG. 3, and an elevated position raised altogether out of the bath, as shown by broken lines in the same Figure. A lifting eye 34g on a transverse channel 34f interconnecting the side members 38 permits lifting the entire conveyor section out of the bath container 10 when desired. Raising of the conveyor in this manner facilitates inspection, cleaning and repairs of the conveyor and bath container. In the conveyor's lowered operating position, the upper stretch of conveyor belt is inclined to the horizontal at an angle of approximately 25° or 30°, with its upper end portion rising above the level of the bath over half or more of the length of the conveyor and extending beyond the end of container 10.

Preferably, the endless conveyor belt is of molded plastic, having an open grid-work form of a type commercially available and used in the shrimp processing industry. The belt has transverse elements and longitudinal elements that tend to hold the shrimp against rolling and sliding around while allowing water to run freely through openings between these elements. Belt tension is established and varied by means of jack-screw tensioning devices 12c of the conventional form. The belt's upper run, which carries the shrimp, overlies and receives sliding support from longitudinally extending bars (not shown). Side plates 12d on the conveyor frame 12a closely adjoining the opposite side edges of the belt along the upper stretch prevent shrimp from falling off the sides of the belt or becoming caught between the sides of the belt and the longitudinal sides of the bath container 10. An adjustable-speed hydraulic or electric drive motor 12e acting through transmission 12f and suitable sprockets 12f' operates the conveyor 12 at any of different selected speeds. In practice belt speed is adjusted to suit the kind of shrimp being processed, required length of cooking time under the stream cooker 16 and related factors.

A ramp plate 10a hinged at 10b on the initial or receiving end wall of the container 10 extends across the full width of the container and normally rests with its lower edge dragging lightly in trailing attitude on the top surface of the belt conveyor 12 so as to chute the shrimp onto the conveyor and prevent them from falling down into the bath container beneath the conveyor's lower end where they will not be picked up. This plate can be swung upwardly out of the way, into its dashed-line position, as depicted in FIG. 3, when the conveyor is to be swung up out of the bath for inspection or repairs or for cleaning of the bath container.

Quantities of shrimp or other articles deposited into the bath would, without suitable means for distribution, tend to be picked up in an unpredictable and varying distribution and volume rate on the conveyor belt. In addition to optimal provision of means to crowd shrimp in the bath toward the conveyor, especially toward the last of a batch, it is desirable, to provide a means to even out the feed and the distribution of the shrimp on the belt conveyor, and especially to distribute them across the width of the belt conveyor. This is desirable for uniform cooking of the shrimp under steam cooker 16; also for uniformity in the rate of delivery of shrimp to the upper apron of multi-channel distributing chute 14 designed to direct the flow of shrimp approximately equally to the respective sets of peeler rolls 18c, 18d in the upper or primary peeler section 18. For these purposes it is known to provide agitation of the bath W and of the shrimp therein, separating and washing them if they tend to stick together, by means of an oscillated paddle-like spreader plate 34. This plate is mounted in depending position on a transverse, horizontal shaft 36 between side supports 38 mounted on the conveyor frame 12a. Plate 34 is positioned along the conveyor run near the line of emergence on the conveyor from the bath. The plate extends across the bath substantially the full width of the belt conveyor with its lower edge submerged to a depth sufficiently above the upper surface of the belt conveyor to pass a layer of shrimp beneath it. The spreader support shaft 36 is rotatively oscillated back and forth in the manner depicted in FIGS. 3 and 4 by means of an adjustable-speed motor 34a, crank 34ab, connecting link 34b and rocker arm 34c. The acting length of the rocker arm can be adjusted to vary the oscillation stroke of spreader plate 34 by shifting the pivot pin eye along slot 34d in arm 34c by first loosening and later retightening nut 34e.

Oscillating motion of the spreader plate in the bath W creates a wave motion in the water accompanied by agitation and physical displacement of shrimp in the bath. The cleated or grilled form of the conveyor creates a current in the bath by drawing water upwardly along its path. This current, together with the wave motion created by the spreader plate, assures a more or less uniform migration of shrimp to the conveyor. Moreover, waves created by the plate wash up the surface of the conveyor and tend to distribute the shrimp across the width of the conveyor belt. The more or less steady flow of shrimp picked up by the conveyor belt next passes on the conveyor beneath the steam cooker 16.

The rate at which shrimp are deposited on the conveyor, and their even distribution thereon are a function of several variable factors which combine to dictate the patterns of currents and wave-like motions within the bath. These factors include the speed and magnitude of spreader plate oscillation; the speed at which the cleated conveyor belt is driven; and also the depth to which the plate and lower end of the conveyor are immersed. Though conveyor belt speed is adjustable, it largely governs cooking time and normally is not varied as a control factor relative to the movement of shrimp from the bath. Spreader plate oscillation speed and stroke are adjustable, however, via adjustable speed motor 34a and slotted arm 34c respectively. Water level is also adjustable to a certain extent by way of a threaded collar 17a in the overflow basin 17b. Screwing the collar down into, or up out of the basin effectively lowers or raises the water level in the bath. Overflow from the bath, resulting from water input or introduction of volumes of shrimp, flows over the top of the collar and out through the drain conduit 17c. If desired, the drain conduit can be detached from the overflow basin and attached to cleaning drain 19 on the bath container 10 to channel away water and debris collected during cleaning.

Cooker 16 comprises a generally flat box-like steam plenum of rectangular proportions and approximately co-extensive in width with the belt conveyor and in length with the upper third to half of the conveyor 12 upon which it is superimposed. The steam plenum comprises an insulated top 16a and a tubular steam distribution frame 16b joined to the underside of the panel 16a around the perimeter thereof. The plenum bottom panel 16c comprises a metal sheet, the edges of which are retained in a suitable elastomeric material 16d in a frame channel 16e secured to the bottom of the distribution duct 16b by bolts 16f at intervals around the perimeter thereof. The bolts 16f extend through the distribution duct 16b and are secured by nuts 16f' to the top panel 16a with appropriate gasketing interposed.

Steam under pressure slightly above atmospheric, such as four or five ounces above atmospheric, occurring at about 215°F, is conducted into the plenum from a source (not shown) by way of a pressure regulating valve 16g and feeder pipe 16h connected to frame duct 16b. The latter has openings 16b' at intervals along its length directed into the interior of the plenum 16 so as to distribute the steam therein. The bottom panel 16c has a large number of steam vent openings 16c' therein, which direct the steam against shrimp lying on the moving conveyor belt 12 over substantially the full width of the belt and over substantially the full length of that portion of the belt which underlies the cooker 16. An adjustable thermostat 16n equipped with a temperature readout gage may be mounted on the cooker 16 to provide for monitor and control of internal temperature. The thermostat is coupled electrically to the steam delivery and pressure regulating system to provide automatic temperatures regulation. Steam inside the cooker is normally maintained at approximately 215 degrees at 4 or 5 ounces of pressure above atmospheric.

Plenum 16 has upper end extensions 16m connected by transversely aligned pivot pins 16j to stationary supports 16k at the side of the conveyor's upper end. Thus the steam plenum may be swung upwardly above the conveyor 12 when and as necessary to clean, service or repair either the steam cooker or the underlying conveyor (FIG. 3). A cold water spray head (not shown) may be provided at the approximate location of pins 16j extending across the width of the conveyor to cool the shrimp emerging from the cooker.

Cooked shrimp dropping over the upper end of the conveyor 12 are guided by the lateral distribution chute 14 into a series of narrowing troughs 14a defined between the widening and heightening divider ribs 14b formed in the sheet comprising the chute 14 (FIG. 4). These tapered channels 14a with heightening walls guide the shrimp reliably into the nips of sets of reciprocative peeler bars and peeler roll pairs in the upper primary peeling or shucking section 18 (FIG. 2). In the illustration, there are six such sets arranged parallel in a bank or tier lying generally in a horizontal plane, with the supply chute 14 disposed for delivering shrimp to the receiving ends of the sets adjacent the cooker 16. As the shrimp are being processed by these sets of peeler bar-roll pair combinations, they are advanced progressively away from such receiving end lengthwise of the peeler rolls, as shown by the arrows in FIG. 2.

Figure 1:
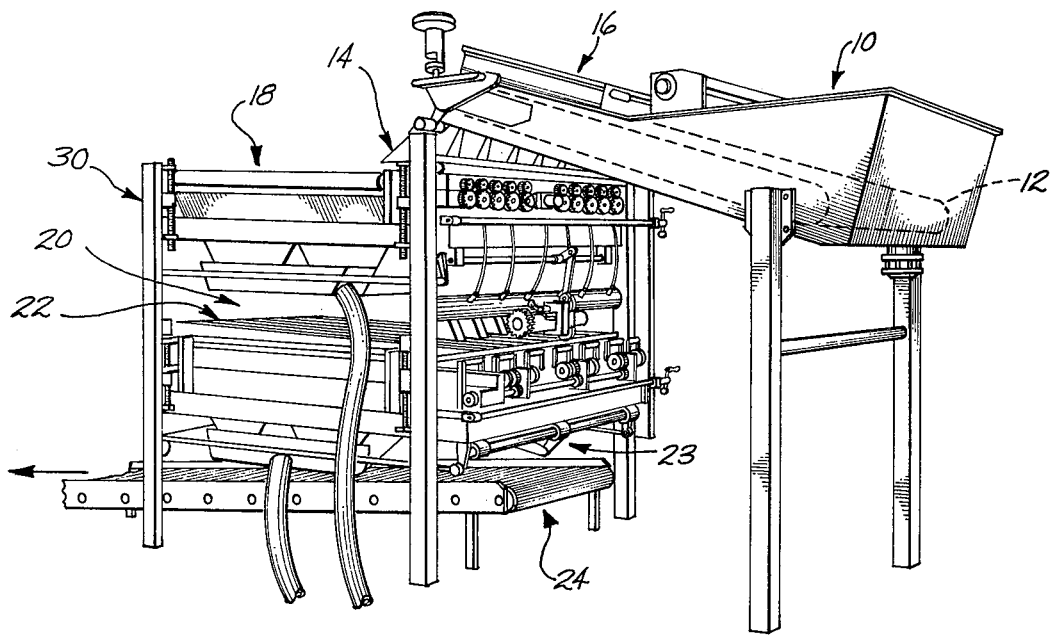
FIG. 1 is an isometric view of the improved shrimp peeling machine, with associated in-feed cooker and conveyor means for the shrimp.
Figure 5:
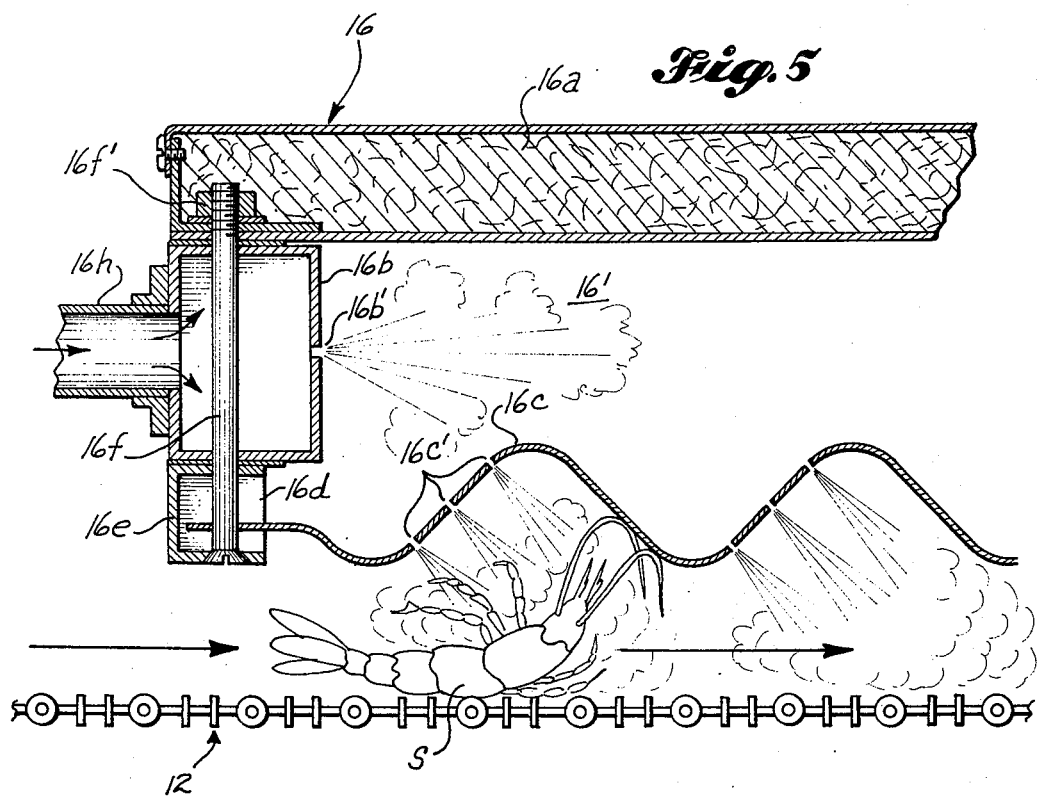
FIG. 5 is an enlarged fragmentary sectional view of the lower end of the cooker section and conveyor belt.
Figure 6:
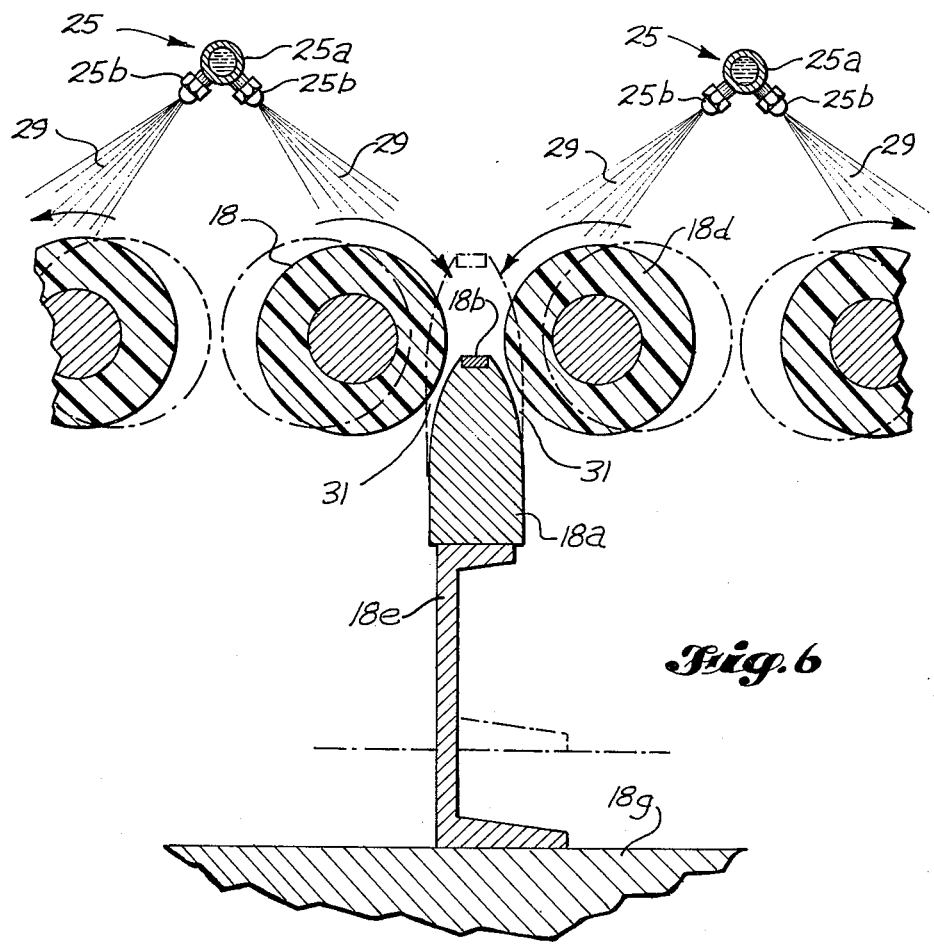
FIG. 6 is a detailed sectional view through a set of peeler rolls and cooperating bar.

Preferably, and as disclosed in the aforesaid Bullock patent application Ser. No. 195,192, each set of peeler rolls and associated peeler bar with overlying shrimp carrier belt is constituted substantially as depicted in FIG. 6. While the shape may vary, as herein illustrated, the elongated horizontal peeler bar 18a, interposed operatively between two peeler rolls, has convex sides which give upward taper to the bar. Its narrowed top has a longitudinally extending belt guide channel therein which accommodates the upper run of an endless carrier belt 18b. As depicted in FIG. 7, the endless carrier belt 18b encircles pulleys 18b1 and 18b2 located beyond the respective ends of the associated peeler rolls and the ends of the reciprocating peeler bar 18a. One of the pulleys is driven so as to move the belt's upper run continuously in the direction away from the receiving end of the associated bar and rolls of each set. The peeling action which accompanies advancement of the shrimp by conveyor belt 18b is generally as described in said Bullock patent application disclosure. The rolls 18c and 18d comprise metal core shafts and covering layers of cast peeler roll material such as solid polyurethane about ¼ inch thick and approximately 55 durometer hardness. The paired rolls turn oppositely with their top sides moving in the direction toward the intervening peeler bar 18a and as they rotate, the interposed peeler bar is reciprocated up and down between the rolls by motion of its support 18e. Accompanying such motion, the rolls are maintained in predetermined spaced relationship to the adjacent side surfaces of the bar by a vertically shaped cam and follower roller mechanism to be described hereinafter. The shaped opposite sides of the peeler bar 18a produce a peeler nip angle (i.e., the included angle opening upwardly) in each of the peeler nips which varies as a function of relative vertical positioning of the rolls and bar suitable to the shrimp being peeled. According to improvements comprising this invention the nip peeler spacings (i.e., at the base of the nip where the bar and roll surfaces are nearest) in the same tier may be varied or adjusted conjointly. Moreover, they may be adjusted so the nip distance will be constant along the length of the rolls, or at the operator's discretion, so that they will either increase or decrease from the receiving end to the discharge end of the rolls.

The bar supports 18e for all of the peeler bars in the same tier are supported on a common rack 18g which is reciprocated up and down at the desired frequency and amplitude. A deflector member 18h overlying the top run of each carrier belt 18b at the completion end of the peeler set deflects the shrimp laterally off the belt and down onto the distribution chute 20 (FIG. 2). A tensioning roll 18j maintains tension in the belt 18b and an associated scraper 18k scrapes any accumulations of slime and waste materials from the back face of the belt as it operates.

Vertically shaped and horizontally tapered cams 18m and 18n are mounted in this embodiment on the respective ends of each of the peeler roll bars and are engaged by paired cam follower rollers on the peeler rolls. These follower rollers enable the peeler rolls to follow curvature of the cams and thereby follow a certain spatial relationship pattern with the adjacent sides of the peeler bar during vertical reciprocating motion of the bar in relation to the associated peeler rolls. For most applications the cams have the same shape vertically as the peeler bars, such that the roll-to-bar clearance is maintained constant during relative vertical bar reciprocation.

Figure 9:
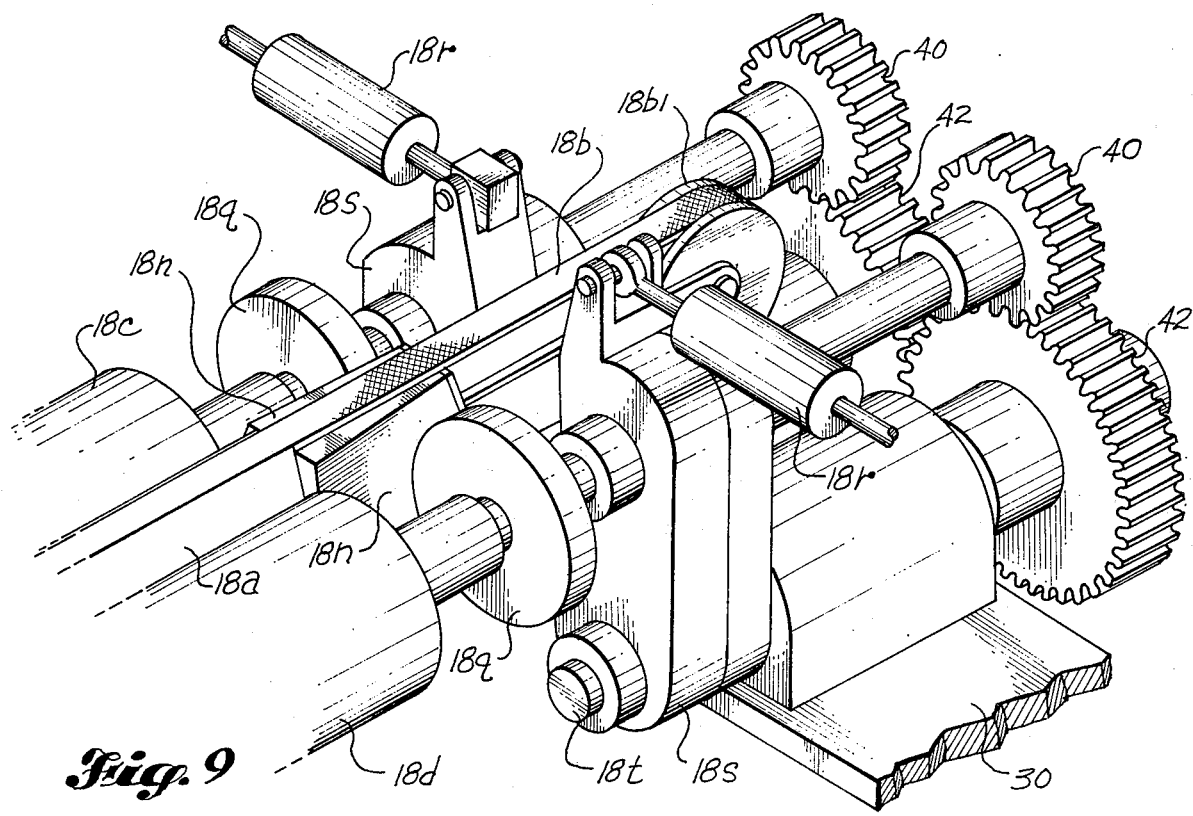

Upright rocker arms 18s support the ends of the peeler rolls for lateral rocking movement toward and from the adjacent sides of the peeler bar 18a (FIGS. 8 and 9 and cams 18m and 18n). Each rocker arm 18s is mounted on a pivot 18t at the lower end thereof fixed on the base frame 30. In the example, individual pneumatic double piston and cylinder actuators 18r for each set of peeler rolls at the ends thereof provide yieldable resilient pressure actuators between adjacent rocker arms. At the opposite sides of the machine, the pneumatic recoil units 18r are attached at one end to the machine frame 30 and at the opposite end to the adjacent rocker arm 18s.

The shaft 18c' of roll 18c is driven by a pinion 40 meshing with a spur gear 42 which turns on the shaft 18t, such that arcuate reciprocation of the peeler roll shaft 18c' on the rocker arm 18s is about the same center as arcuate travel of the pinion 40 about the center of spur gear 42. Accordingly, rotative driving engagement between the spur gear and pinion is unaffected by rocking motion of the associated peeler roll 18c. As will be seen from FIGS. 10 and 12, opposing cam rollers 18p of the pairs are oppositely canted to the axis of the associated peeler roll shafts 18c' so as to bear uniformly against the mutually tapered opposite side faces of the associated cams 18m. Cam rollers 18q are similarly canted to bear uniformly on cams 18n. The cam rollers are rotatively mounted on hollow hubs 18p'.

The rocker arms 18s are of two-part leaved construction, both leaves or parts being pivotally supported independently on shaft 18t. Shaft 18t is rotatively supported intermediate its ends in a journal that is free to revolve on an upright pivot 18t' on frame bar 60e so as to permit varying angularity between peeler roll shafts 18c' and 18d'.

The part 18s' carries the hub 18p', and the part 18s" incorporates a combined rotational and thrust bearing 18s" a carrying the peeler roll shaft 18c'. An arcuate slot in rocker arm part 18s' centered on shaft 18t passes the shank of a releasable clamp bolt 19 which is threaded into a locating aperture in the arm part 18s" so as to permit adjusting and holding the relative angularity between the arm parts 18s' and 18s". Such relative angularity adjustments vary the stand-off or nip clearance of the associated peeler roll 18c in relation to the adjacent face of the peeler bar 18a maintained by the cam roller 18p, engaging the face of cam 18m.

The companion peeler rolls 18d of the respective pairs are or may be similar in form, mounting, driving and actuation, hence require no separate description herein.

As previously indicated and as seen in FIG. 7, the cams 18m and 18n taper in thickness endwise toward the respective ends of the peeler bar 18a, such that positioning of the paired cam rollers 18p and 18q at different stations lengthwise of the respective cams determines the spacing between the opposing cam rollers and thereby clearance between the associated peeler rolls and the interposed peeler bar 18a at opposite ends of the peeler rolls. In FIG. 12 the set of rollers in the middle of the figure are equi-distantly spaced from the peeler bar along the entire length of the rollers, i.e., the condition of zero nip taper. In the set of peeler rollers illustrated in the lower portion of the Figure, the nip spacing is greatest at the right, and tapers to the left, whereas in the upper part of the Figure, the reverse is true. As a further feature, the roll-bar nips at corresponding ends of all the rolls in a bank or tier are adjusted conjointly. As will be appreciated, the showing of diverse nip taper conditions in FIG. 12 is merely pictorial, for convenience in describing the relative adjustability features. In practice all roll sets in a tier are coordinated and have like settings.

In order to effect coordinated adjustments of the peeler roller spacings first at one end of the peeler roll sets, a crank 60 (left portion of FIG. 12) turns a shaft 60a having worm gears spaced lengthwise thereof which drivingly engage wheels 60b in turn mounted on screw shafts 60c. These screw shafts supported by stationary brackets 60c1 and 60c2 extending parallel with the peeler rolls and are threaded in traveling housings 60d carrying frame bar 60e. The latter provides a traveling support for the gear and rocker arm support shafts 18c. Thus, when the crank 60 is turned, the frame bar 60e is shifted transversely of its length, namely in the direction of the axes of the peeler rolls in order to move the rocker assemblies and thereby the pairs of cam rollers 18p to varying stations along the associated cams 18m. The positions attained are indicated on a marker scale 60s due to travel of the marker 60s' on screw thread on the shaft 60a. The peeler rolls 18c and 18d move lengthwise with the rack bar 60e.

At the opposite end of the machine, a crank 80 turning a shaft 80a having worm gears engaging wheels 80b effects conjoint turning of the screw shafts 80c. The threads of these screw shafts engaged in traveling housings 80d respectively carrying the opposite ends of the frame bar 80e to shift such bar lengthwise of the peeler rolls, and with the bar the stub shaft 21 and its horizontally pivoted support 23. The shaft 21 carries rocker arm parts 18s' and 18s'' pivotally supported thereon. Hence rotation of crank 80 moves cam rollers 18q to varying stations along tapered cams 18n. As depicted in the right-hand portion of FIG. 10, peeler roll shaft 18c' is rotatively and slideably received in the journal 18s''c. Therefore, it is possible by rotation of crank 80 to adjust the spacing between paired cam rollers 18q through engagement thereof with the cams 18n at different stations along the length of the latter independently of the established or changing cam station settings applied to the cam rollers 18p on cams 18m at the opposite ends of the peeler rolls by means of crank 60.

Similar features of adjustment of the peeler bar and peeler roll camming mechanisms are applied to the peeler roll assemblies in the lower tier representing the polishing roller section 22.

The provisions for making independent adjustments in the position of each end of the rollers in a section relative to the peeler bars makes possible several operating modes. The rollers may be operated parallel to the peeler bar to provide a nip of constant width of from 0.00 to 0.025 inch. Alternatively the rollers may be adjusted to provide a tapered nip, tapering in either direction and by adjustable amounts. Thus the nip clearance at one end may be set at any value from 0.00 to 0.025 inch and at the other end at any value in the same range. Operating the peelers with a tapered nip is a preferred operating mode, in particular wherein the nip is wider at the input end where the shrimp are introduced for peeling. The initially wider nip at the input end allows the fully shelled relatively large shrimp to settle deeper into the nip for initial shucking of body appendages and loosening of the shell. As the shrimp are conveyed along the peeling rollers and the main shell parts progressively removed, the narrowing nip tends to refine the peeling action to the removal of smaller tendril-like pieces and thin particles of shell without catching the tapered tip of the body. In normal operation the rollers are driven in rotation at from 60 to 80 feet per minute surface speed and the peeler bars are vertically reciprocated at 120 to 130 strokes per minute with stroke travel positioning the top of the peeler bar from a point approximately even with the top peripheral surface of the rollers to a point slightly below the rotational axis of the rollers. It should be noted that the polishing roller section is normally operated with the roll-bar nips adjusted differently than in the peeler section. In the final peeling or "polishing" tier the nips are preferably set narrow. At the receiving ends of the rolls where the shrimp are deposited the setting is narrowest so as to remove any remaining fine particles, threads or flakes, and the nip then diverges or widens toward the opposite end or discharge end so that the cleaned shrimp bodies can more fully enter the nips to provide maximum surface to surface contact and thereby enhance the abrading and polishing of the meat.

The illustrative mechanism for vertically reciprocating the bars cooperating with the peeler rolls may vary. In FIG. 11, support for the peeler bars 18a and bar supports 18e in the upper tier is provided by a frame 86, and for the peeler bars 18a and bar supports 18e in the lower tier by a frame 88. At its four corners the frame 86 is supported on connecting links 86a which extend approximately vertically from the outer ends of corresponding horizontal arms 86b of bell cranks having depending arms 86c interconnected by a link 86d. The bell crank at each end of the machine, mounted for pivot on the frame 30, has a third arm 86e by which it is reciprocatively driven through a link 86f connecting such arm 86e with a rotating crank 86g. The latter is driven at selectively variable speed by a power unit 100. The vertical stroke of the reciprocative peeler bars 18a is made adjustable by selective positioning of the upper end of the link 86f in a slot 86e' extending lengthwise of the arm 86e.

Similarly, the lower or polishing deck peeler bar support frame 88 is supported at its corners by vertically extending links 88a connected at their lower ends to the arms 88b of the bell cranks, mounted for pivot on the frame 30, having depending arms 88c interconnected by links 88d. A power driven crank 88f acting through a vertical link 88g connected to an extension of arm 88b causes vertical reciprocation of the lower deck peeler bars. Such arm extension is slotted as indicated at 88b' to permit adjusting the effective drive radius of the arm 88b and thereby the stroke of the peeler bars in the lower deck 22.

Thus, it will be evident that the peeler bars may be made to reciprocate vertically at varying speeds determined by the variable speed adjustment of the power drive 100 which turns the cranks 88f and 86g, and that the stroke of the peeler bars in the primary peeling deck 18 may be varied independently of the stroke adjustment permitted in the peeler bars of the polishing peeler deck 22. These adjustable features and others provided in the machine enable it to be tuned or set in varying ways accommodating the different types of shrimp or other articles to be peeled and polished in the machine.

A spring 89b similar to that shown in FIG. 13 is mounted on the frame 30 at each of the approximate four corners of the peeler bar frames 86 and 88. Supported on fixed collar 89e, this spring is compressed toward the end of each down-stroke of the peeler bar support frame. The spring is positioned on an upright centering post 89b which also supports the collar 89e and projects upwardly through a guide bore in the bracket member 89f mounted near the corner of the guide frame (86 in FIG. 13). The member 89f is of inverted cupped configuration receiving the upper end of spring 89d. The lower end of post 89d is threaded into stationary 89g, so that with lock nut 89i loosened and turning of the post 89d it becomes possible to adjust the degree to which the spring is compressed on each downstroke. The primary purpose of springs 89d is to store force and energy during completion of peeler bar assembly downstroke motion so they may lend initial upward drive impetus thereto when the stroke is reversed. This action relieves in large measure the necessity for a heavy surge of power to the drive mechanism itself at that stage and thereby reduces the power capacity requirement of the reciprocation drive. It may be noted that part of the loading imposed on the total drive mechanism in starting each upstroke is the resistance imposed by the cam followers which must be wedged apart by the upwardly tapered peeler nip control cams. Such loading is also made up of peeler roll mechanism inertia and inertia associated with the mass of the entire reciprocative assembly.

The peeling and polishing roller sections are each equipped with water spray systems which are generally designated 25 and 27 in FIG. 2. As shown in the cross-sectional view of the peeling section in FIG. 6, the sprays 29 function to continually wash peelings from the shrimp, rollers 18, peeler bars 18a and carrier belts 18b, and to lubricate the active surfaces of these components. Also, by virtue of the angle to the horizontal at which the sprays are directed, the shrimp are impelled toward the nips 31 while peelings are washed through the nips. The spray system consists of water-carrying sprayer conduits 25a arranged above the rollers. The sprayer conduits are positioned between and parallel to the roller pairs. Spray nozzles 25b are mounted at regular intervals along each sprayer conduit with alternate nozzles directed to the same side. The arrangement and control of the mains which supply water to the sprayer conduits is largely a matter of design choice; however manual valves to control spray pressure are desirable. In addition, since operation of the peeling and polishing sections may have somewhat different spray requirements, a spray control valve for each section is desirable.

With the operation of the spray system just described, a system to channel away the water and residue of the peeling and polishing processes is obviously a practical necessity. This function is served by stainless steel catch basins 50, 51, 52 and 53 as shown in FIG. 2, mounted immediately below both roller sections 18 and 22 on the frame 30. The catch basins receive water and waste solids washed down through the nips in each roller pair and subsequently channel this run-off into interconnecting troughs 54 and 55. The troughs funnel the run-off from the catch basins into large-diameter drain conduits 56 and 57 which carry the material away for proper disposal of solids.

From the foregoing description and related drawings of the illustrative embodiment of the invention, it will be seen that there is disclosed an improved versatile apparatus for processing of shrimp and similar articles which by nature vary considerably in size, type and condition as presented to the peeling mechanism. The novel adjustability features of the mechanism employing a tapered cam and shiftable followers may be applied broadly to a machine having one peeler bar and associated peeler rolls or by use of suitable coordinating means, to a machine having a bank of such peeler rolls and bar sets working in parallel and similarly and conjointly adjustable. Moreover, it is pointed out that certain mechanical design variations and changes departing from the specifics of the disclosure may be employed within the intended scope of the concepts and teachings of the invention as defined in the claims.

We claim:

1. In apparatus for peeling shrimp and similar articles including a pair of peeler rolls arranged parallel in a generally horizontal tier, an associated horizontally extending, vertically reciprocated peeler bar interposed operatively between the rolls and having opposed curved peeler surfaces facing the respective rolls to effect peeling of the shrimp in the nips therebetween, means associated with the bar to advance the shrimp unidirectionally lengthwise of the rolls; at each end of said tier a cam connected to be reciprocated vertically with the peeler bar and having opposed vertically curved cam surfaces, and pairs of cooperable cam followers respectively engaging the cam surfaces of the respective cams, the cam followers being operatively connected to the respective peeler rolls at the ends of the tier to position the ends of the rolls relative to the associated bar during bar reciprocation, at least one such cam being tapered in width longitudinally of the bars, and means to selectively adjust the position of the cam followers associated with the tapered cam along the cam taper, thereby to selectively vary the nip spacings between said peeler rolls and bar at the associated end of the tier.

2. The apparatus defined in claim 1, including a base support frame, sub-frame means commonly supporting the peeler bars extending in a generally horizontal plane mechanism on the base frame moveably supporting and driving said sub-frame means to reciprocate vertically in relation to the base frame, said mechanism including spring means reactively interposed between the base frame and sub-frame cushioning motion reversals of the sub-frame during such reciprocation.

3. The apparatus defined in claim 2, including means to vary the effective spring means stiffness permitting tuning the mechanism into a resonance condition aiding in the driving of said sub-frame.

4. In apparatus for peeling shrimp and similar articles including a peeler roll arranged generally horizontally, an associated horizontally extending peeler bar disposed operatively adjacent to the roll to form a peeler nip therebetween, means to effect relative vertical reciprocation between the roll and bar to effect peeling of the shrimp in said nip, and means associated with the bar to advance the shrimp unidirectionally lengthwiise of the roll; the improvement comprising adjustment means cooperating with the roll and associated bar including first means operable to adjustively vary the nip spacing therebetween at one end of the roll, and second means operable to adjustively vary the nip spacing therebetween at the opposite end of the roll, thereby to vary the nip taper, said first and second means each including cam means and cooperating cam follower means operatively connected with the peeler bar and peeler roll at opposite ends thereof, said cam means being tapered lengthwise of the roll, and means in association with each cam means operable to effect shifting of the selective position of the cam follower means relative to the cam means along the line of taper independently at such opposite ends 5. The apparatus defined in claim 4, wherein the first and second adjustment means afford independent ranges of adjustments permitting varying the nip taper from zero taper through both positive and negative tapers lengthwise of the roll, and also permitting varying the average nip distance.

6. Apparatus for peeling shrimp and similar articles including a primary peeler section comprising a plurality of pairs of driven primary peeler rolls arranged parallel in a generally horizontal tier, associated horizontally extending, vertically reciprocated peeler bars respectively interposed operatively between the rolls of each pair to effect primary peeling of the shrimp in the nips therebetween, means associated with the respective bars to advance the shrimp unidirectionally lengthwise of the pairs of primary peeler rolls from a receiving end of the primary peeler section during peeling, means to distribute the shrimp among the primary peeler roll pairs at the receiving end of said primary peeler section, a polishing peeler section comprising a plurality of pairs of driven polishing peeler rolls arranged parallel in a generally horizontal tier, horizontally extending, vertically reciprocated peeler bars respectively interposed operatively between the rolls of each polishing peeler roll pair of effect polishing of the peeled shrimp in the nips therebetween, mean associated with the respective latter bars to advance the shrimp unidirectionally lengthwise of the pairs of polishing peeler rolls from a receiving end of the polishing peeler section during polishing, means to distribute the shrimp from the primary peeler section among the polishing peeler roll pairs at the receiving end of said polishing peeler section, adjustment means in each section cooperating with the pairs of rolls and associated bars in that section to adjustively vary the nip spacings therebetween by corresponding amounts, whereby the adjustment to effect rough peeling in the primary peeler section may be made independently of the adjustment to effect polishing peeling in the polishing peeler section, said adjustment means including in operative association with the bars at least at one end of each section cam means connected to be reciprocated in a selected plane synchronously with the associated bars of the section, said cam means having opposed cam surfaces of predetermined curved contour along the cam dimension in the direction of reciprocation and cam taper in a transverse dimension in said plane, separate cam follower means operatively engaging the respective cam surfaces, said cam follower means and cam means being relatively adjustable to position the cam follower means at different stations on said cam surfaces along the line of taper thereof, the cam follower means engaging one cam surface being connected to an end of one peeler roll of at least one pair in the associated section, and the cam follower means engaging the relatively opposite cam surface being connected to the corresponding end of the other peeler roll of the pair, so as to control the spacing between peeler rolls of the pair and thereby the nip spacings between such rolls and the interposed bar as a function of vertical positioning of such bar during reciprocation thereof, and wherein the adjustment means are operable to adjustively shift the station of the cam follower means on the cam means along the line of taper of said cam means engaged thereby, so as to vary said nip spacings.

7. The apparatus defined in claim 6, having a combination of said cam means, cooperable cam follower means and adjustment means individual to and operatively associated with the peeler rolls at each end of each section.

8. Apparatus for peeling shrimp and similar articles including a main frame, a primary peeler section mounted at a relatively elevated position in said main frame and comprising a plurality of pairs of driven primary peeler rolls arranged parallel in a generally horizontal tier, associated horizontally extending, vertically reciprocated peeler bars respectively interposed operatively between the rolls of each pair to effect primary peeling of the shrimp in the nips therebetween, means to distributively deposit unpeeled shrimp upon the primary peeler roll pairs at one end of said primary peeler section, means associated with the respective bars to advance the deposited shrimp unidirectionally lengthwise of the pairs of primary peeler rolls from said end during peeling, a polishing peeler section mounted in said main frame substantially congruently beneath said primary peeler section and comprising a plurality of pairs of driven polishing peeler rolls arranged parallel in a generally horizontal tier, horizontally extending, vertically reciprocated peeler bars respectively interposed operatively between the rolls of each polishing peeler roll pair to effect polishing of the peeled shrimp in the nips therebetween, means mounted in said main frame receiving shrimp peeled by said primary peeler section and distributively depositing the same upon the polishing peeler roll pairs at one end of the polishing peeler section, means associated with the respective latter bars to advance the shrimp unidirectionally lengthwise of the pairs of polishing peeler rolls from said one end of the polishing peeler section during polishing, a drive motor, and separate drive means drivingly connecting said drive motor respectively to the peeler bars of the primary peeler section and also to the peeler bars of the polishing peeler section, said respective drive means being adjustable to permit independent selection of the stroke of such primary peeler bars and the stroke of such polishing peeler bars.

9. The apparatus defined in claim 8, including adjustment means in each section cooperating with the pairs of rolls and associated bars in that section to adjustively vary the nip spacings therebetween by corresponding amounts, whereby the adjustment to effect rough peeling in the primary peeler section may be made independently of the adjustment to effect polishing peeling in the polishing peeler section.

10. The apparatus defined in claim 8 further including nip control means operatively associated with each pair of peeler rolls and intervening peeler bar determining the nip dimension therebetween during the latter's stroke of reciprocation, primary peeler nip dimension adjustment means common to the nip control means for the primary peeler section bars and roll pairs, and polishing peeler nip dimension adjustment means common to the nip control means for the polishing peeler section bars and roll pairs, whereby the peeling action of the two sections may be adjustively and independently varied.

11. The apparatus defined in claim 10 further wherein the respective nip dimension adjustment means include independent adjustment provisions at the respective ends of each of the two sections operable to adjustively vary the nip dimension of the bars and roll pairs at one such end independently of the nip dimension similar adjustment at the opposite section end, and thereby vary nip taper correspondingly in the roll pairs of each section independently of nip taper in the other section.

12. The apparatus defined in claim 11, further including nip dimension controlling cam means on each end of each peeler bar, cam follower means on the respective ends of the rolls maintained in engagement with said cam means during the bar reciprocation stroke, said cam means being shaped vertically in relation to shape of the peeler bar vertically so as to control nip dimension during the reciprocation.

13. The apparatus defined in claim 12 wherein the respective cam means are tapered longitudinally of the peeler bars and the nip dimension adjustment provisions further include means to effect relative shifting between the tapered cam means and cam follower means longitudinally of the respective peeler bars in common at each end of such bars in each peeler section.

14. The apparatus defined in claim 8 further including sub-frame means commonly supporting the peeler bars of each peeler section and guided for vertical reciprocation in the main frame effected by the drive means, and spring means reactively interposed between the main frame and the sub-frame cushioning motion reversals of the sub-frame during such reciprocation.

15. The apparatus defined in claim 14, including means to vary the effective spring means stiffness permitting tuning the mechanism into a resonance condition aiding in the driving of said sub-frame.

* * * * *

UNITED STATES PATENT AND TRADEMARK OFFICE
CERTIFICATE OF CORRECTION

PATENT NO. : 3,975,797
DATED : August 24, 1976
INVENTOR(S) : Eldon L. Grimes et al It is certified that error appears in the above-identified patent and that said Letters Patent are hereby corrected as shown below:

Column 1, line 27-28 "device" should be --devise--

Column 13, line 8 "mean" should be --means--

Signed and Sealed this

Ninth Day of November 1976

[SEAL]

Attest:

RUTH C. MASON
Attesting Officer

C. MARSHALL DANN
Commissioner of Patents and Trademarks